E. ELLIS.
Hog and Cattle Vat.
No. 225,514. Patented Mar. 16, 1880.
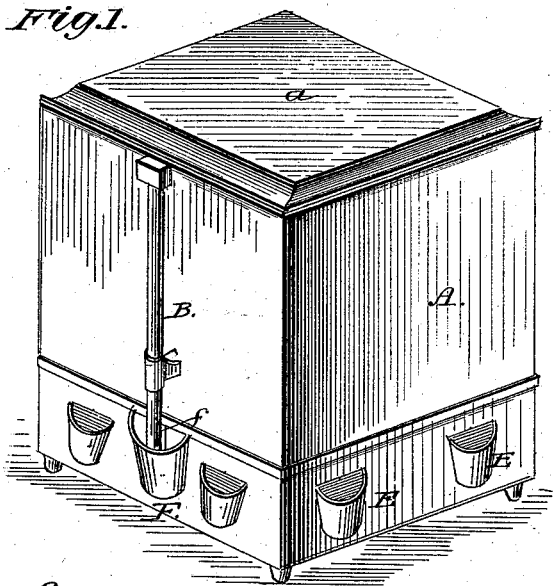
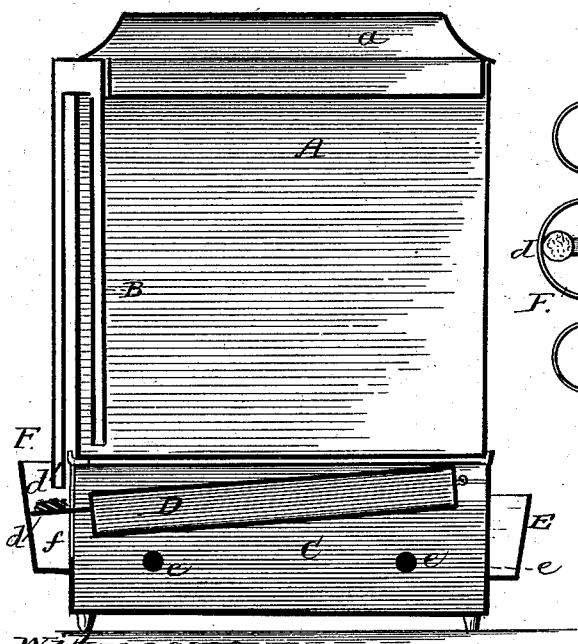
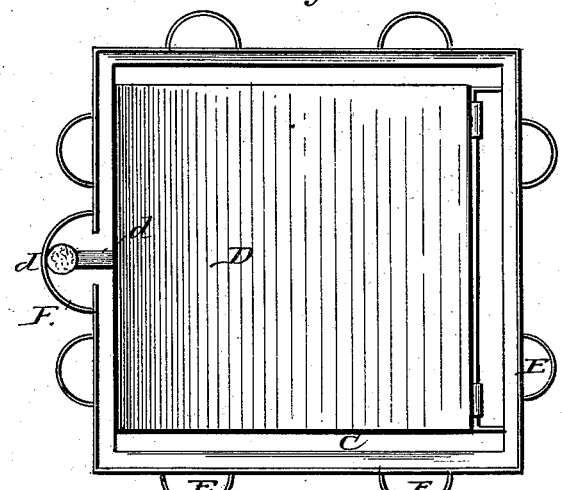

United States Patent Office.

EPHRAIM ELLIS, OF WAUBECK, IOWA, ASSIGNOR OF ONE-HALF OF HIS RIGHT TO GEORGE J. WRIGHT, OF SAME PLACE.

HOG AND CATTLE VAT.

SPECIFICATION forming part of Letters Patent No. 225,514, dated March 16, 1880.

Application filed October 27, 1879.

*To all whom it may concern:*

Be it known that I, EPHRAIM ELLIS, of Waubeck, in the county of Linn and State of Iowa, have invented certain new and useful Improvements in Hog and Cattle Vats; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view, Fig. 2 is a vertical section, and Fig. 3 is a plan or top view, of the lower section of the trough or vat, the superimposed tank or reservoir having been removed.

Similar letters of reference indicate corresponding parts in all the figures.

This invention relates to vats or tanks for supplying hogs, cattle, and stock generally with water for drinking purposes; and it consists in the improvement hereinafter fully described, and particularly pointed out in the claim.

In the drawings, A is a tank or reservoir of any desired size, preferably provided with a cover, $a$, and having a siphon, B, on one side, the outer or exterior branch of which extends below its inner parallel branch, as clearly shown in Fig. 2 of the drawings. C is another smaller reservoir, upon which A is placed, and which is provided with a hinged float, D, and projecting buckets E E, which communicate with the reservoir through apertures $e\ e$, so that the water in the buckets will stand at the same height as in the reservoir C. F is another larger bucket, which opens up into the reservoir through a slot, $f$, instead of an aperture.

That side of the hinged float D which faces bucket F has a projecting arm, $d$, which is inserted into said bucket through the slot $f$, and is provided upon its top or upper side with a packing-disk, $d'$, which, when the float is in a level position, will bear against and close the lower open end of the exterior branch of the siphon B, which projects down into the bucket F.

From the foregoing description, taken in connection with the drawings, the operation of this invention will readily be understood.

The reservoirs A C are filled with water, which raises the float D, so that its packed disk $d\ d'$ will close the siphon. As the water falls in the lower reservoir, C, the buckets E of which are within easy reach of the cattle or stock to be watered, the float will sink, opening the siphon B, which draws the water from the upper tank or reservoir, A, into the lower until the float is raised sufficiently to again close the siphon and stop the supply. In this manner the water in the lower reservoir is maintained at an even level, preventing waste and keeping it sweet and pure, as the stock can have access to it only through the buckets E E.

Having thus described my invention, I claim and desire to secure by Letters Patent of the United States—

The combination of the supply-tank or reservoir A, provided with the siphon B, and water-trough or vat C, having buckets E E F, and provided with the hinged float D, having arm $d$ and packing-disk $d'$, when constructed and arranged to operate substantially as and for the purpose herein shown and described.

In testimony that I claim the foregoing as my own I have hereto affixed my signature in presence of two witnesses.

EPHRAIM ELLIS.

Witnesses:
 HERRMAN JULIUS GREMM,
 GEORGE JOSEPH WRIGHT.